United States Patent [19]

Kawata et al.

[11] Patent Number: 4,845,621
[45] Date of Patent: Jul. 4, 1989

[54] SPEED CONTROL APPARATUS

[75] Inventors: Shouji Kawata, Okazaki; Osamu Miyake, Aichi; Nobuyasu Suzumura, Toyota, all of Japan

[73] Assignee: Aisin Seiki Kabushiki Kaisha, Kariya, Japan

[21] Appl. No.: 86,991

[22] Filed: Aug. 19, 1987

[30] Foreign Application Priority Data

Aug. 19, 1986 [JP] Japan ................ 61-193841

[51] Int. Cl.$^4$ ............................................. B60K 31/00
[52] U.S. Cl. ........................ 364/426.04; 364/424.1; 74/864; 74/866; 180/179
[58] Field of Search ........... 364/426.04, 424.1, 431.07; 74/864, 866; 180/170, 176, 179; 123/352

[56] References Cited

U.S. PATENT DOCUMENTS

| | | | |
|---|---|---|---|
| 4,335,428 | 6/1982 | Miki et al. | 364/424.1 |
| 4,338,666 | 7/1982 | Suzuki et al. | 364/424.1 |
| 4,506,752 | 3/1985 | Hara et al. | 180/179 |
| 4,697,478 | 10/1987 | Mastumoto et al. | 180/179 |
| 4,698,762 | 10/1987 | Moriya et al. | 364/424.1 |
| 4,709,595 | 12/1987 | Hayama | 180/176 |
| 4,720,793 | 1/1988 | Watanabe et al. | 364/424.1 |
| 4,736,813 | 4/1988 | Hayama et al. | 180/179 |
| 4,747,326 | 5/1988 | Braun | 74/866 |

FOREIGN PATENT DOCUMENTS 0142044 5/1985 European Pat. Off. .
0142046 5/1985 European Pat. Off. .

*Primary Examiner*—Gary Chin
*Attorney, Agent, or Firm*—Sughrue, Mion, Zinn, Macpeak, and Seas

[57] ABSTRACT

There is disclosed a speed control apparatus installed in an automobile equipped with an automatic transmission. This apparatus includes a microcomputer, an input interface circuit, an output interface circuit, an actuator for the automatic transmission, and an actuator for maintaining the speed of the automobile at the speed set by the driver. The apparatus controls the operation of the transmission in such a way that it shifts into another gear, depending on the automobile speed or engine speed and also on the engine load or the throttle opening. The speed set by the driver is maintained by controlling the throttle opening. The apparatus estimates the driving force of the transmission when it makes an upshift, from the present speed, the present throttle opening, and the present transmission gear. If the estimated force is not sufficiently large, then such an upshift is inhibited.

3 Claims, 13 Drawing Sheets

|  |  |  | TD1 DEVIA. MORE THAN 3 km/h |  |  |  |  | TD2 DEVIA. LESS THAN 3 km/h IN ms |  |  |  |  |
|---|---|---|---|---|---|---|---|---|---|---|---|---|
| SHIFT | BEFORE GEAR SHIFT | GEAR | T1 | T2 | T3 | T4 | T5 | T1 | T2 | T3 | T4 | T5 |
| UP-SHIFT | THROTTLE TH3 TO TH7 | LOCKED 1-3 | 200 | 400 | 800 | 100 | 800 |  |  |  |  |  |
|  |  | 4 | 200 | 250 | 700 | 100 | 600 |  |  |  |  |  |
|  |  | UNLOCKED 1-3 | 0 | 0 | 850 | 0 | 750 |  |  |  |  |  |
|  |  | 4 | 0 | 0 | 750 | 0 | 550 |  |  |  |  |  |
|  | TH0 TO TH2 | 1-3 | 200 | 0 | 750 | 100 | 750 |  |  |  |  |  |
|  |  | 4 | 200 | 0 | 650 | 100 | 650 |  |  |  |  |  |
| DOWN-SHIFT |  | 1-2 | 300 | 0 | 750 | 200 | 750 | 4300 | 4000 | 4750 | 4200 | 4750 |
|  |  | 3 | 200 | 0 | 850 | 100 | 850 | 4200 | 4000 | 4850 | 4100 | 4850 |

FIG.15a  DRIVING FORCE (kg)

| INDEX = 0 | SPEED = 40 km/h | | | |
|---|---|---|---|---|
| THROTTLE OP. θ$_N$ | GEAR | | | |
| | 1 | 2 | 3 | 4 |
| TH7 | 500 | 300 | 250 | 200 |
| TH6 | 350 | 250 | 210 | 170 |
| TH5 | 200 | 190 | 160 | 130 |
| TH4 | 70 | 100 | 100 | 100 |
| TH3 | 30 | 60 | 60 | 70 |
| TH2 | 0 | 20 | 30 | 40 |
| TH1 | 0 | 0 | 0 | 10 |
| TH0 | 0 | 0 | 0 | 5 |

FIG.15b  DRIVING FORCE (kg)

| INDEX = 1 | SPEED = 50 km/h | | | |
|---|---|---|---|---|
| THROTTLE OP. θ$_N$ | GEAR | | | |
| | 1 | 2 | 3 | 4 |
| TH7 | 490 | 300 | 220 | 180 |
| TH6 | 340 | 240 | 180 | 150 |
| TH5 | 190 | 170 | 130 | 110 |
| TH4 | 100 | 50 | 80 | 80 |
| TH3 | 50 | 30 | 50 | 50 |
| TH2 | 20 | 10 | 30 | 20 |
| TH1 | 0 | 0 | 10 | 10 |
| TH0 | 0 | 0 | 0 | 0 |

FIG.15c  DRIVING FORCE (kg)

| INDEX = 2 | SPEED = 60 km/h | | | |
|---|---|---|---|---|
| THROTTLE OP. θ$_N$ | GEAR | | | |
| | 1 | 2 | 3 | 4 |
| TH7 | 200 | 310 | 200 | 150 |
| TH6 | 50 | 250 | 160 | 120 |
| TH5 | 0 | 170 | 110 | 80 |
| TH4 | 0 | 80 | 60 | 50 |
| TH3 | 0 | 0 | 10 | 20 |
| TH2 | 0 | 0 | 0 | 0 |
| TH1 | 0 | 0 | 0 | 0 |
| TH0 | 0 | 0 | 0 | 0 |

FIG.15d  DRIVING FORCE (kg)

| INDEX = 3 | SPEED = 70 km/h | | | |
|---|---|---|---|---|
| THROTTLE OP. θ$_N$ | GEAR | | | |
| | 1 | 2 | 3 | 4 |
| TH7 | 0 | 320 | 210 | 140 |
| TH6 | 0 | 260 | 170 | 110 |
| TH5 | 0 | 160 | 110 | 70 |
| TH4 | 0 | 50 | 60 | 40 |
| TH3 | 0 | 0 | 0 | 10 |
| TH2 | 0 | 0 | 0 | 0 |
| TH1 | 0 | 0 | 0 | 0 |
| TH0 | 0 | 0 | 0 | 0 |

FIG.15e  DRIVING FORCE (kg)

| INDEX = 4 | SPEED = 80 km/h | | | |
|---|---|---|---|---|
| THROTTLE OP. θ$_N$ | GEAR | | | |
| | 1 | 2 | 3 | 4 |
| TH7 | 0 | 290 | 220 | 130 |
| TH6 | 0 | 230 | 180 | 110 |
| TH5 | 0 | 130 | 120 | 60 |
| TH4 | 0 | 20 | 70 | 30 |
| TH3 | 0 | 0 | 20 | 10 |
| TH2 | 0 | 0 | 0 | 0 |
| TH1 | 0 | 0 | 0 | 0 |
| TH0 | 0 | 0 | 0 | 0 |

FIG.15f  DRIVING FORCE (kg)

| INDEX = 5 | SPEED = 90 km/h | | | |
|---|---|---|---|---|
| THROTTLE OP. θ$_N$ | GEAR | | | |
| | 1 | 2 | 3 | 4 |
| TH7 | 0 | 250 | 220 | 130 |
| TH6 | 0 | 190 | 180 | 110 |
| TH5 | 0 | 90 | 110 | 60 |
| TH4 | 0 | 0 | 60 | 30 |
| TH3 | 0 | 0 | 0 | 10 |
| TH2 | 0 | 0 | 0 | 0 |
| TH1 | 0 | 0 | 0 | 0 |
| TH0 | 0 | 0 | 0 | 0 |

FIG.16

| SPEED km/h | GEAR | MAX. FORCE kg |
|---|---|---|
| 40 | 2 | 150 |
| | 3 | 40 |
| | 4 | 0 |
| 50 | 2 | 180 |
| | 3 | 45 |
| | 4 | 25 |
| 60 | 2 | 180 |
| | 3 | 75 |
| | 4 | 30 |
| 70 | 2 | 200 |
| | 3 | 100 |
| | 4 | 30 |
| 80 | 2 | 250 |
| | 3 | 150 |
| | 4 | 40 |
| 90 | 2 | 240 |
| | 3 | 210 |
| | 4 | 40 |

FIG.17
GEAR SHIFT LINES FOR AUTOMATIC TRANSMISSION

| THROTTLE OP. $\theta_N$ | GEAR SHIFT | | | | | |
|---|---|---|---|---|---|---|
| | 1–2 | 2–3 | 3–4 | 4–3 | 3–2 | 2–1 |
| TH7 | 1000 | 1850 | 2700 | 2600 | 1300 | 850 |
| TH6 | 800 | 1600 | 2100 | 1850 | 950 | 250 |
| TH5 | 700 | 1200 | 1700 | 1250 | 750 | 200 |
| TH4 | 550 | 1000 | 1450 | 950 | 500 | 200 |
| TH3 | 400 | 800 | 1200 | 800 | 450 | 200 |
| TH2 | 350 | 700 | 1000 | 750 | 450 | 200 |
| TH1 | 250 | 500 | 750 | 600 | 400 | 200 |
| TH0 | 250 | 400 | 700 | 400 | 350 | 200 |

SPEED SENSOR OUTPUT (ROTATIONAL SPEED, IN RPM)

FIG.18
LOCKUP LINES FOR AUTOMATIC TRANSMISSION

| THROTTLE OP. $\theta_N$ | LOCKED OR UNLOCKED GEAR | | | | | |
|---|---|---|---|---|---|---|
| | 2 LO. | 3 LO. | 4 LO. | 4 UN. | 3 UN. | 2 UN. |
| TH7 | 800 | 1200 | 1700 | 1600 | 1050 | 700 |
| TH6 | 800 | 1200 | 1700 | 1600 | 1050 | 700 |
| TH5 | 800 | 1200 | 1700 | 1600 | 1050 | 700 |
| TH4 | 800 | 1200 | 1700 | 1600 | 1000 | 700 |
| TH3 | 800 | 1000 | 1600 | 1250 | 850 | 700 |
| TH2 | 800 | 1000 | 1300 | 1000 | 850 | 700 |
| TH1 | 800 | 1000 | 1150 | 1000 | 850 | 700 |
| TH0 | 800 | 1000 | 1000 | 1000 | 850 | 700 |

SPEED SENSOR OUTPUT (ROTATIONAL SPEED, IN RPM)

FIG.19
GEAR SHIFT LINES FOR CRUISE CONTROL

| THROTTLE OP. $\theta_N$ | GEAR SHIFT | | | | | |
|---|---|---|---|---|---|---|
| | 1-2 | 2-3 | 3-4 | 4-3 | 3-2 | 2-1 |
| TH7 | 1200 | 2200 | 3200 | 2700 | 2100 | 850 |
| TH6 | 1000 | 1950 | 3000 | 1950 | 1650 | 700 |
| TH5 | 900 | 1700 | 2400 | 1400 | 1300 | 600 |
| TH4 | 850 | 1500 | 2300 | 1200 | 800 | 500 |
| TH3 | 650 | 1200 | 2000 | 1000 | 600 | 350 |
| TH2 | 450 | 750 | 1500 | 800 | 450 | 250 |
| TH1 | 300 | 550 | 900 | 650 | 400 | 200 |
| TH0 | 250 | 500 | 800 | 400 | 350 | 200 |

SPEED SENSOR OUTPUT (ROTATIONAL SPEED, IN RPM)

LOCKUP LINES FOR CRUISE CONTROL

| THROTTLE OP. $\theta_N$ | LOCKED OR UNLOCKED GEAR | | | | | |
|---|---|---|---|---|---|---|
| | 2 LO. | 3 LO. | 4 LO. | 4 UN. | 3 UN. | 2 UN. |
| TH7 | 800 | 2200 | 3150 | 3000 | 2150 | 700 |
| TH6 | 800 | 1950 | 2800 | 2600 | 1900 | 700 |
| TH5 | 800 | 1600 | 2150 | 2000 | 1500 | 700 |
| TH4 | 800 | 1400 | 1900 | 1800 | 1000 | 700 |
| TH3 | 800 | 1350 | 1750 | 1500 | 850 | 700 |
| TH2 | 800 | 1350 | 1600 | 1000 | 850 | 700 |
| TH1 | 800 | 1350 | 1350 | 1000 | 850 | 700 |
| TH0 | 800 | 1350 | 1350 | 1000 | 850 | 700 |

SPEED SENSOR OUTPUT (ROTATIONAL SPEED, IN RPM)

SPEED CONTROL APPARATUS

FIELD OF THE INVENTION

The present invention relates to an automotive speed control apparatus which incorporates both an automatic transmission control means for controlling an automatic transmission, such as a four-speed automatic transmission equipped with electronically controlled two-way overdrive, and a cruise control means for permitting the vehicle to maintain a preset speed. More particularly, the invention relates to a speed control apparatus comprising a control circuit which controls an automatic transmission control apparatus and a cruise control apparatus in an interrelated manner.

BACKGROUND OF THE INVENTION

In an automobile equipped with a conventional automatic transmission, the gear ratio is changed in the manner described below. In D, or drive, the transmission selects the optimum gear according to the vehicle speed and the throttle opening and depending on a gear shifting map including certain gear shifting lines, such as the gear shifting map shown in FIG. 21.

The automatic transmission has a lockup function. Specifically, when the transmission is in a certain gear, e.g., third or overdrive (fourth), and the vehicle speed exceeds a certain value, the torque-converter clutch is engaged. Under this condition, the output shaft of the torque converter is directly connected to the output shaft of the engine, i.e., the torque converter locks up. In other conditions, the clutch is disengaged, i.e., the torque converter is unlocked, and the input shaft of the torque converter is connected to the output shaft of the engine.

In this way, the torque converter is unlocked, and the function of the converter is utilized to produce shifts according to the load when the automobile is started, accelerated rapidly, or the speed is changed. This permits the automobile to start, accelerate, and change its speed smoothly. Thus, knocking or stall of the engine is unlikely to occur. When the load is small, or when the engine speed is high, the torque converter is locked to prevent the torque converter from slipping; otherwise the power would be wasted and the fuel economy would be reduced.

The cruise control apparatus controls the throttle opening to maintain a desired preset speed. The control operation is performed according to road conditions.

In the aforementioned automobile, the automatic transmission control apparatus is independent of the cruise control apparatus. When the vehicle speed is maintained constant by the operation of the cruise control apparatus, the gear of the automatic transmission may be shifted because the transmission control apparatus detects the condition of the throttle opening that is varied for maintaining the vehicle speed.

Suppose the automobile cruises at 80 Km/h on an undulating road. When it ascends a hill, the throttle opening is 80%. When it descends a hill, the throttle opening is 40%. It is assumed now that the automatic transmission control apparatus uses the gear shifting map shown in FIG. 21. When the automobile ascends a hill, the transmission downshifts from overdrive to third. When it descends a hill, the transmission upshifts from third to overdrive.

When the automatic transmission upshifts or downshifts in this way, slight shock of engagement is transmitted to the vehicle body. As a result, the passenger may feel uncomfortable. Especially, when the road undulates, downshifts and upshift are frequency made, producing hunting. In this case, the comfortableness of the passenger is required to be taken into account.

Japanese Patent Laid-Open No. 237,258/1985 has disclosed a technique for inhibiting any gear shifting by making the automatic transmission control apparatus inactive while the vehicle speed is maintained by the cruise control apparatus. Consequently, no shock occurs when the cruise control apparatus is in operation.

A technique for making a gear shift after the torque converter is unlocked is disclosed in Japanese Patent Laid-Open No. 39,354/1981. However, when the vehicle speed is maintained constant, it cannot exclude the possibility that the need of gear shifts arises. When the torque converter is unlocked and a gear shift is made, if the road undulates and downshifts and upshifts are frequently made, then the automobile cannot cope with such a situation. Especially, when the cruise speed is set to such a speed that a sufficient driving force cannot be obtained even if an upshift is made, the automatic transmission upshifts and downshifts repeatedly, producing hunting. This will make the passenger uncomfortable. The problem of the hunting is not fully solved by the technique disclosed in the aforementioned Japanese Patent laid-open bulletin.

SUMMARY OF THE INVENTION

In view of the foregoing problems, it is an object of the present invention to provide a speed control apparatus which prevents the occurrence of hunting when a gear shift is made while the vehicle speed is maintained constant.

The above and other objects of the invention are achieved by a speed control apparatus comprising: an automatic transmission control means for controlling the operation of the automatic transmission of an automobile in such a way that the transmission shifts into another gear, depending on the vehicle speed or the engine speed and also on the engine load or the throttle opening; and a cruise control means which controls the throttle opening to maintain the vehicle speed at the speed set by the driver. The speed control apparatus estimates the driving force of the transmission obtained when the transmission makes an upshift, from the present engine speed, the throttle opening, and the gear of the transmission, and inhibits such an upshift if a sufficient driving force is not obtained. The driving force is given by torque of engine × transmission gear ratio × reduction gear ratio × power transmission efficiency × conversion ratio of torque converter × factor for accommodating loss

If the maximum force of the transmission obtained after an upshift is made is less than the presently obtained driving force of the transmission, then the transmission is prevented from upshifting. Thus, the possibility that the transmission frequently upshifts and downshifts is eliminated.

BRIEF DESCRIPTION OF THE DRAWINGS

FIG. 15 shows tables of data stored in the memory of the apparatus shown in FIG. 1;

FIG. 16 shows a table of data including various values of maximum driving force;

FIG. 17 shows a table of gear shifts used for an automatic transmission according to the invention;

FIG. 18 shows a table of data indicating various conditions of the torque-converter clutch of an automatic transmission according to the invention;

FIG. 19 shows a table of various combinations of the throttle opening and the engine speed, for use in the speed control apparatus shown in FIG. 1 when the automatic transmission control apparatus and the cruise control apparatus are in operation;

DETAILED DESCRIPTION OF THE INVENTION

Figure 1:
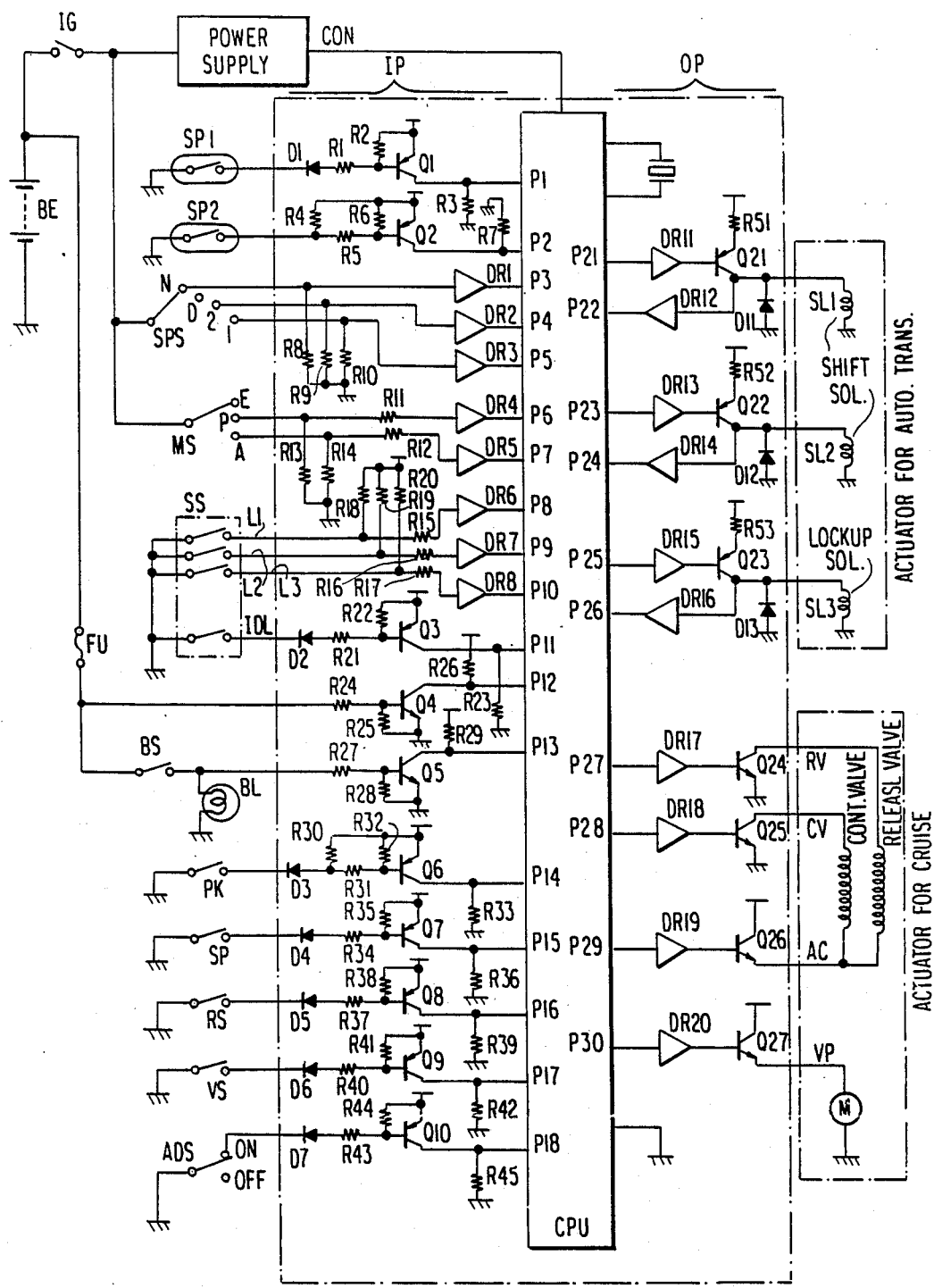
FIG. 1 is a diagram of a control circuit constituting the electronic control means of a speed control apparatus according to the invention.

Referring to FIG. 1, there is shown a control circuit that constitutes the electronic control means of a speed control apparatus according to the invention. The control circuit includes a microcomputer CPU or microprocessor in the form of one chip. The microcomputer CPU consists of a control section, an arithmetic section, and registers. The automobile in which the speed control apparatus is installed carries a battery BE that is a direct current source. A constant-voltage power supply circuit CON is connected to the microcomputer CPU, an input interface circuit IP, and an output interface circuit OP. The power supply circuit CON is operated when the ignition switch IG of the automobile is closed. A speed sensor SP1 comprises a reed switch for producing pulses at a frequency proportional to the engine speed. The sensor SP1 cooperates with a magnet connected to the cable of the speedometer of the automobile. Another speed sensor SP2 comprises a reed switch that produces pulses at a frequency proportional to the speed of the output shaft of the automatic transmission mounted in the automobile. The sensor SP2 cooperates with a magnet which rotates with a shaft attached to the output shaft of the transmission.

The reed switch of the speed sensor SP1 is connected to the base of a transistor $Q_1$ via a diode $D_1$ and a resistor $R_1$. When the reed switch of the sensor SP1 is closed, the transistor $Q_1$ is driven into conduction. Then, a voltage is applied across a resistor $R_3$, and the input port $P_1$ of the microcomputer CPU goes high. When the reed switch of the speed sensor SP1 is opened, the transistor $Q_1$ is driven into cutoff by the action of a resistor $R_2$. In this state, the resistor $R_3$ is grounded, and the input port $P_1$ of the microcomputer CPU goes low. The reed switch of the speed sensor SP2 is connected to the base of a transistor $Q_2$ via a resistor $R_5$. When the reed switch of the sensor SP2 is closed, the transistor $Q_2$ is turned on. Then, a voltage is applied across a resistor $R_7$. The input port $P_2$ of the microcomputer CPU goes high. When the reed switch of the sensor SP2 is opened, the transistor $Q_2$ is biased off by resistors $R_4$ and $R_6$. Under this condition, the resistor $R_7$ is grounded, and the input port $P_2$ of the microcomputer CPU goes low.

A selector lever position switch SPS detects the position of the selector lever of the automatic transmission. When the lever is put in neutral, the movable contact of the switch SPS is connected to a contact N. When it is put in D, or drive, the movable contact is connected to a contact D. When it is put in second and first, the movable contact is connected to contacts 2 and 1, respectively. The contacts N, 2, and 1 are connected to pull-down resistors $R_8$, $R_9$, $R_{10}$, respectively. When the selector lever is put in none of neutral, second, first, the outputs from buffer amplifiers $DR_1$, $DR_2$, $DR_3$ assume a low level, and the input ports $P_3$, $P_4$, $P_5$ of the microcomputer CPU takes a low level. When the selector lever is put in neutral, second, or first, the contact N, 2, or 1 of the switch SPS is engaged. Then, the buffer amplifier $DR_1$, $SR_2$, or $DR_3$ receives an electric current from the battery BE, and the output from the energized amplifier goes high. As a result, the input port $P_3$, $P_4$, or $P_5$ goes high.

A mode switch MS can assume one of three positions E, P, and A. When the switch MS takes the position P, the apparatus is placed in an automatic . transmission control mode. When the switch MS is switched to the position A, the apparatus is placed in an automatic transmission/cruise control mode. When the switch MS is in the position P, the battery BE is connected to the input of a buffer amplifier $DR_4$ via a resistor $R_{11}$, and the output of the amplifier $DR_4$ assumes a high state. In this condition, the input port $P_6$ of the microcomputer CPU assumes a high state. When the switch MS is in the position A, the battery BE is coupled to a buffer amplifier $DR_5$ via a resistor $R_{12}$. The input of the amplifier $DR_5$ takes a high state, and the output of the amplifier $DR_5$ assumes a high state. In this state, the input port $P_7$ of the microcomputer CPU takes a high state. When the switch MS is put in the position E, the input of the amplifier $DR_4$ or $DR_5$ is caused to go low by a pull-down resistor $R_{13}$ or $R_{14}$, and the output of the amplifier goes low. As a result, the input port $P_6$ or $P_7$ of the microcomputer CPU goes low.

A throttle opening sensor SS detects the throttle opening or the degree to which the accelerator pedal is pushed down. In this example, the sensor SS has contacts $L_1$, $L_2$, $L_3$, and $I_{DL}$. Each of the three contacts $L_1$, $L_2$, $L_3$ can deliver a high-level signal and a low-level signal. Therefore, the output signal from the sensor can assume any one of eight levels, which are represented by 0-7, according to the throttle opening. The contact $I_{DL}$ produces a signal indicating that the driver releases the accelerator pedal, i.e., the throttle valves are closed. More specifically, when the three contacts $L_1$, $L_2$, $L_3$ are engaged, resistors $R_{15}$, $R_{16}$, $R_{17}$ which are connected in series with the contacts $L_1$, $L_2$, $L_3$, respectively, make the the inputs of the amplifiers $DR_6$, $DR_7$, $DR_8$ assume a low level, and the outputs of these amplifiers take a low level. As a result, the input ports $P_8$, $P_9$, $P_{10}$ of the microcomputer CPU go low. When the contacts $L_1$, $L_2$, $L_3$ are not engaged, the input signals to the buffer amplifiers $DR_6$, $DR_7$, $DR_8$ are made to go high by the action of pull-up resistors $R_{18}$, $R_{19}$, $R_{20}$ and the resistors $R_{15}$, $R_{16}$, $R_{17}$, respectively. Then, the input ports $P_8$, $P_9$, $P_{10}$ of the microcomputer CPU go high. When the common contact $I_{DL}$ is engaged, an electric current flows into the base of a transistor $Q_3$ via a diode $D_2$ and a resistor $R_{21}$. The transistor $Q_3$ conducts, allowing a voltage to be applied across a resistor $R_{23}$. The input port $P_{11}$ of the microcomputer CPU then goes high. When the common contact $I_{DL}$ is not engaged, the transistor $Q_3$ is driven into cutoff by a resistor $R_{22}$, so that the resistor $R_{23}$ is grounded. The input port $P_{11}$ of the microcomputer CPU goes low.

A voltage is applied to the input port $P_{12}$ from the battery BE via a fuse FU. A transistor $Q_4$ is biased into conduction by resistors $R_{24}$ and $R_{25}$. As a result, the input port $P_{12}$ assumes a low level. If the fuse FU melts because of a trouble with the brake system, for example, then the transistor $Q_4$ is driven into cutoff. This causes the input port $P_{12}$ of the microcomputer CPU to go high.

When the driver pushes down on the brake pedal, a brake switch BS is closed. Then, a brake lamp BL lights up. In particular, when the switch BS is closed, the voltage supplied from the battery BE is applied to a transistor $Q_5$ via resistors $R_{27}$ and $R_{28}$, thus turning the transistor $Q_5$ on. The input port $P_{13}$ of the microcomputer CPU goes low. When the brake pedal is released and the brake switch BS is opened, the transistor $Q_5$ is turned off. Then, the input port $P_{13}$ of the microcomputer CPU goes high.

A parking switch PK senses that the selector lever is put in P. When the selector lever is put in P, the parking switch PK is closed. Then, a voltage is applied to a transistor $Q_6$ via resistors $R_{30}$, $R_{31}$, $R_{32}$ and a diode $D_3$ to drive the transistor $Q_6$ into conduction. A voltage drop is developed across a resistor $R_{33}$ to cause the input port $P_{14}$ of the microcomputer CPU to go high. When the parking switch PK is opened, the transistor $Q_6$ is biased off. At this time, the input port $P_{14}$ of the microcomputer CPU is made to go low by the resistor $R_{33}$.

A set switch SP is used to permit the driver to set the speed maintained by the cruise control means. When the set switch SP is closed, the present vehicle speed is set as the cruise speed maintained by the cruise control means. Specifically, when the set switch SP is closed, an electric current flows into the base of a transistor $Q_7$ via a diode $D_4$ and a resistor $R_{34}$, biasing the transistor $Q_7$ into conduction. A voltage is applied across a resistor $R_{36}$. The input port $P_{15}$ of the microcomputer CPU goes high. When the set switch SP is opened, the resistor $R_{35}$ drives the transistor $Q_7$ into cutoff, grounding the resistor $R_{36}$. As a result, the input port $P_{15}$ of the microcomputer CPU goes high.

A resume switch RS is used when a cruise control operation is resumed after the cruise control means is set at a desired velocity and the operation of this means is once stopped. Specifically, when the resume switch RS is closed, an electric current flows into the base of a transistor $Q_8$ via a diode $D_5$ and a resistor $R_{37}$, turning the transistor on. A voltage is applied cross a terminal $R_{39}$, so that the input port $P_{16}$ of the microcomputer CPU goes high. When the resume switch RS is opened, the resistor $R_{38}$ biases the transistor $Q_8$ off, grounding the resistor $R_{39}$. The result is that the input port $P_{16}$ of the microcomputer CPU goes low.

A negative pressure for controlling the cruise control means is stored in a surge tank. When the pressure inside the surge tank drops, a vacuum switch VS is closed. The negative pressure inside the surge tank is controlled by a release valve RV and a control valve CV (described later). This negative pressure is supplied by a vacuum pump VP that is driven by an electric motor M. The pressure supplied is detected by the vacuum switch VS. When this switch VS is closed, an electric current flows into the base of a transistor $Q_9$ via a diode $D_6$ and a resistor $R_{40}$, driving the transistor $Q_9$ into conduction. A voltage is then applied across a resistor $R_{42}$. The input port $P_{17}$ of the microcomputer CPU goes high. When the vacuum switch VS is opened, the resistor $R_{41}$ biases the transistor $Q_9$ into cutoff, thus grounding the resistor $R_{42}$. Then, the input port $P_{17}$ of the microcomputer CPU goes low.

When the movable contact of a cruise main switch ADS is in contact with a contact ON, the cruise control means operates. When the movable contact of the switch ADS is switched to another contact OFF, the operation of the cruise control means is stopped. When the movable contact of the switch ADS is in contact with the contact ON, an electric current flows into the base of a transistor $Q_{10}$ via a diode $D_7$ and a resistor $R_{43}$, biasing the transistor $Q_{10}$ into conduction. Then, a voltage is applied across a resistor $R_{45}$, and the input port $P_{18}$ of the microcomputer CPU goes high. When the movable contact of the switch is in contact with the contact OFF, the resistor $R_{44}$ drives the transistor $Q_{10}$ into cutoff, so that the resistor $R_{45}$ is grounded. The input port $P_{18}$ of the microcomputer CPU goes low.

The output ports of the microcomputer CPU are connected in the manner described below. An actuator for determining the gear of the automatic transmission includes shift solenoids SL1 and SL2 which are selectively energized and deenergized to produce four speeds from first to overdrive. The following table shows one example of the combination of energization and deenergization of the solenoids.

| solenoid | first | second | third | OD |
| --- | --- | --- | --- | --- |
| SL1 | energized | energized | deenergized | deenergized |
| SL2 | deenergized | energized | energized | deenergized |

The actuator for the automatic transmission further includes a lockup solenoid SL3. When this solenoid SL3 is energized, the torque converter is locked. When it is deenergized, the converter is unlocked.

When the output ports $P_{21}$ and $P_{22}$ of the microcomputer CPU assume a low state and a high state, respectively, the outputs from buffer amplifiers $DR_{11}$ and $DR_{12}$ take a low state and a high state, respectively. At this time, a transistor $Q_{21}$ conducts, energizing the shift solenoid SL1 via a resistor $R_{51}$. When the output ports $P_{21}$ and $P_{22}$ take a high level and a low level, respectively, the outputs from the buffer amplifiers $DR_{11}$ and $DR_{12}$ assume a high level and a low level, respectively. At this time, the transistor $Q_{21}$ does not conduct, thus deenergizing the shift solenoid SL1. Similarly, when the output ports $P_{23}$ and $P_{24}$ of the microcomputer CPU are in a low state and a high state, respectively, the shift solenoid SL2 is energized. When the output ports $P_{23}$ and $P_{24}$ take a high level and a low level, respectively, the solenoid SL2 is deenergized. When the output ports $P_{25}$ and $P_{26}$ of the microcomputer CPU take up a low level and a high level, respectively, the lockup solenoid SL3 is energized. When the output ports $P_{25}$ and $P_{26}$ are in a high level and a low level, respectively, the solenoid SL3 is deenergized. A resistor $R_{52}$ and a transistor $Q_{22}$ form a switching circuit. Likewise, a resistor $R_{53}$ and a transistor $Q_{23}$ form a switching circuit. Diodes $D_{11}$, $D_{12}$, $D_{13}$ are flywheel diodes. Buffer amplifiers $DR_{11}$–$DR_{20}$ act as driver circuits.

A release valve RV and a control valve CV determine the degree to which the throttle valves are opened by a vacuum actuator. When the cruise control means is in operation, the present vehicle speed is compared with the preset speed. The solenoid of the control valve CV is energized or deenergized to reduce the difference between these two speeds down to zero. When the solenoid is energized, a passage is formed which permits the negative pressure inside the surge tank to be sent to the vacuum actuator. When the solenoid is deenergized, the passage is blocked. When the solenoid of the release valve RV is deenergized, the negative pressure inside the vacuum actuator is discharged to the atmosphere. When the solenoid is energized, this discharge passage is interrupted.

More specifically, when the output ports $P_{27}$ and $P_{29}$ of the microcomputer CPU take a high level and a low level, respectively, transistors $Q_{24}$ and $Q_{26}$ conduct, energizing the solenoid of the release valve RV. When the output ports $P_{27}$ and $P_{29}$ assume a low state and a high state, respectively, the transistors $Q_{24}$ and $Q_{26}$ are driven into cutoff. At this time, the solenoid of the release valve RV is deenergized. When the output ports $P_{28}$ and $P_{29}$ of the microcomputer CPU take a high state and a low state, respectively, transistors $Q_{25}$ and $Q_{26}$ conduct, energizing the solenoid of the control valve CV. When the output ports $P_{28}$ and $P_{29}$ are in a low state and a high state, respectively, neither the transistor $Q_{25}$ nor $Q_{26}$ conducts, deenergizing the solenoid of the control valve RV.

The negative pressure inside the surge tank which is controlled by the release valve RV and the control valve CV is supplied by the aforementioned vacuum pump VP, which is driven by the motor M described already. When the output port $P_{30}$ of the microcomputer CPU takes a low state, the output from the buffer amplifier $DR_{20}$ assumes a low level, causing the transistor $Q_{27}$ to conduct. At this time, the motor M is driven. When the output port $P_{30}$ is in a high state, the output from the buffer amplifier $DR_{20}$ takes on a high level, biasing the transistor $Q_{27}$ off. As a result, the motor M is stopped.

Figure 2:
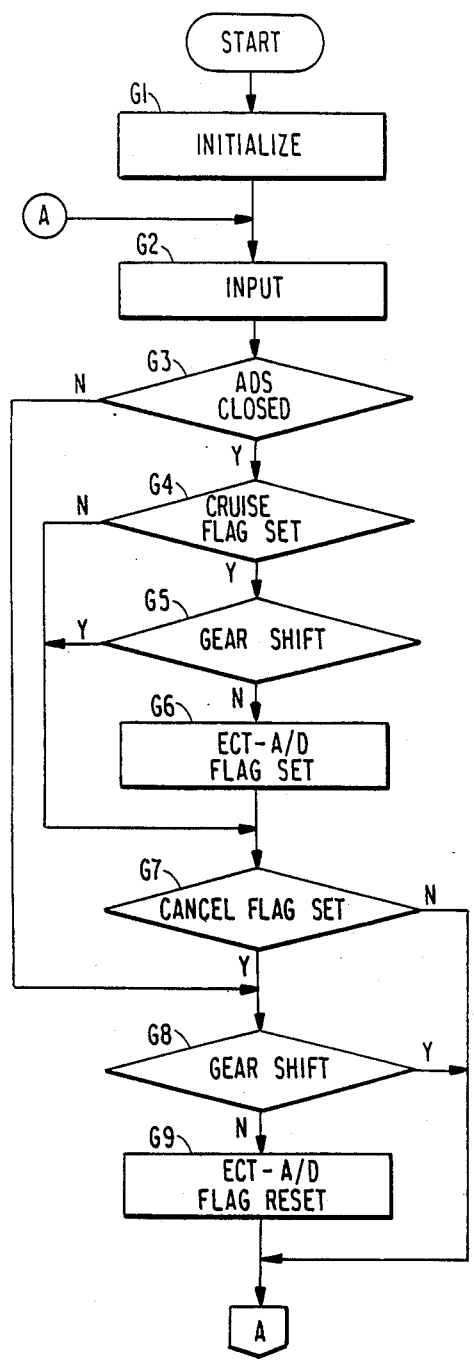
FIGS. 2–6 show a general flowchart for illustrating a series of operations performed by the speed control apparatus shown in FIG. 1.

The control circuit of the speed control apparatus constructed as described above operates in the manner described below. FIGS. 2-6 show a general flowchart for illustrating the manner in which the speed control apparatus operates. Referring to FIG. 2, the memory and the output ports which are necessary to execute the present control operation are initialized (step G1). The condition of each input port is read (step G2). Then, a check is made to see if the cruise control apparatus and the automatic transmission control apparatus are in operation. If the cruise control apparatus should be set into operation, then a routine is executed to see what conditions should be satisfied before the operation is initiated.

A decision is made to see whether the cruise main switch ADS is closed or open (step G3). If it is closed, a decision is made to see if a flag allowing a cruise control operation is set (step G4). If the flag is set, a check is performed to ascertain whether a gear shift is now being made (step G5). If not so, an ECT-A/D flag is set to permit a cruise control operation while the automatic transmission control apparatus is in operation (step G6). Then, a check is done to determine whether a flag for canceling the cruise control operation is set (step G7). If this flag is reset, control exits from this routine. If the check made in step G3 indicates that the cruise main switch ADS is open, a check is performed to ascertain whether a gear shift is presently being made (step G8). If not so, the ECT-A/D flag is reset, and control exits from this routine. That is, if a gear shift is presently being made, this condition is maintained. After the shift is completed, the ECT-A/D flag is set or reset.

The cruise control apparatus is set into operation according to the condition of the ECT-A/D flag, and a gear shifting line is selected. When the driver pushes down on the accelerator pedal to operate the kickdown system, rapidly opening the throttle valves, the cruise control apparatus will not be operated even if all the conditions permitting the operation of the cruise control apparatus are met.

Figure 3:
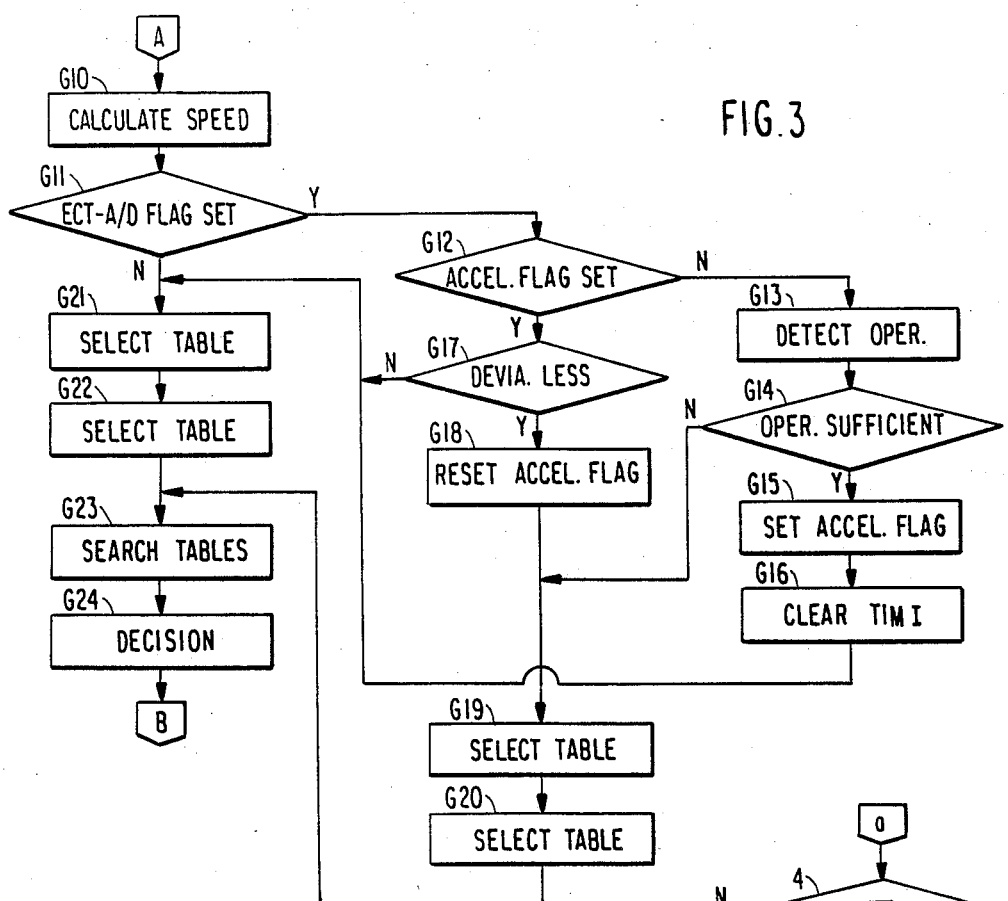

Referring next to FIG. 3, the present vehicle speed is calculated (step G10). A check is performed to see whether the ECT-A/D flag is set (step G11). If it is not set, the table shown in FIG. 17 is selected (step G21). This table is used when only the automatic transmission control apparatus operates. The table shown in FIG. 18 and used for lockup in the automatic transmission is selected (step G22). The gear and the condition of the torque-converter clutch are selected out of these tables, depending on the present vehicle speed (step G23). Then, a check is performed, using the found data, to ascertain whether the gear and the condition of the torque-converter clutch are appropriate in relation to the present speed (step G24).

If the ECT-A/D flag is found to be set (step G11), then a check is made to see whether a flag indicating the operation of the accelerator pedal is set (step G12). Usually, this flag is not set at the beginning of this control operation and so a check is carried out to determine whether the accelerator pedal is pushed (step G13). That is, the throttle opening sensor SS detects the change in the throttle opening. A check is performed to ascertain whether the accelerator pedal is depressed beyond a certain location (step G14). Then, the flag indicating the operation of the accelerator pedal is set (step G15). When the cruise control apparatus and the automatic transmission control apparatus are operated, a timer clock that generates a timeout signal after a relatively long period of time is employed. This timer clock TimI which inhibits any upshift is reset (step G16). The table which is shown in FIG. 17 and used when only the automatic transmission control apparatus operates is selected (step G21l). The table shown in FIG. 18 and used for lockup when only the automatic transmission control apparatus operates is selected (step G22). The gear and the condition of the torque-converter clutch which are suitable for the present vehicle speed are selected from these tables (step G23). Then, a check is performed, using the selected data, to determine whether the gear and the condition of the clutch are appropriate (step G24).

Figures 20, 21:
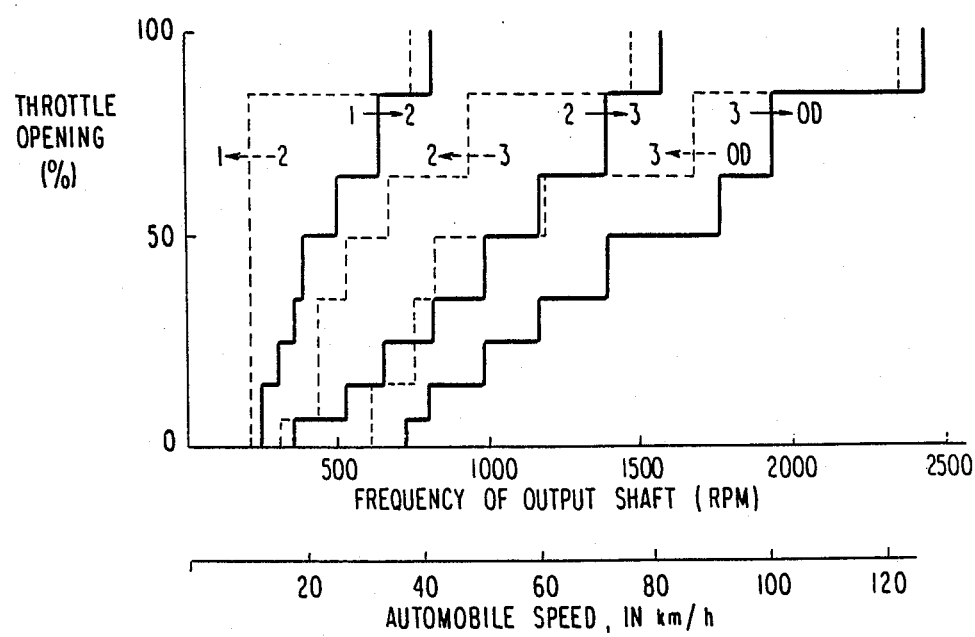
FIG. 20 shows a table of various combinations of the throttle opening and the engine speed, for illustrating various lockup conditions used when the automatic transmission control apparatus and the cruise control apparatus of the speed control apparatus shown in FIG. 1 are in operation.
FIG. 21 shows a map of gear shifts made by the prior art automatic transmission control apparatus.

If it is found that the flag indicating the operation of the accelerator pedal is set (step G12), and if the deviation of the vehicle speed from the preset value is judged to be less than a certain threshold value (step G17), then the flag indicating the operation of the accelerator pedal is reset (step G18). The table which is shown in FIG. 19 and used when the cruise control apparatus and the automatic transmission control apparatus are in operation is selected (step G19). Then, the table that is shown in FIG. 20 and used for the torque-converter clutch when the cruise control apparatus and the automatic transmission control apparatus are in operation is selected (step G20). The gear and the condition of the torque-converter clutch which are appropriate for the present vehicle speed are selected from these selected tables (step G23). A decision is made, using the selected data, to determine whether present gear and the condition of the clutch are suitable (step G24). If the operation of the accelerator pedal is detected (step G13), and if the throttle opening sensor SS senses that the pedal has been depressed to a lesser extent than a predetermined level (step G14), then control proceeds from step G19 to step G24.

If the flag indicating the operation of the accelerator pedal is found to be set (step G12), and if it is found that the deviation of the present speed from the preset speed exceeds a certain threshold value (step G17), then control proceeds from step G21 to step G24.

Specifically, when the driver pushes down on the accelerator pedal to operate the kickdown system, the flag indicating the operation of the accelerator pedal is set (step G15). Then, a table of data that is used only when the automatic transmission control apparatus is in operation is selected (step G21), and a table of data concerning the torque-converter clutch that is used when only the automatic transmission control apparatus is in operation is selected (step G22), until the deviation of the present speed decreases sufficiently (step G17). Thereafter, a table of data used when the cruise control apparatus and the automatic transmission control apparatus are operated is selected (step G19). Also, a table of data is selected that is used for the torque-converter clutch when the cruise control apparatus and the automatic transmission control apparatus are in operation (step G20).

Figure 4:
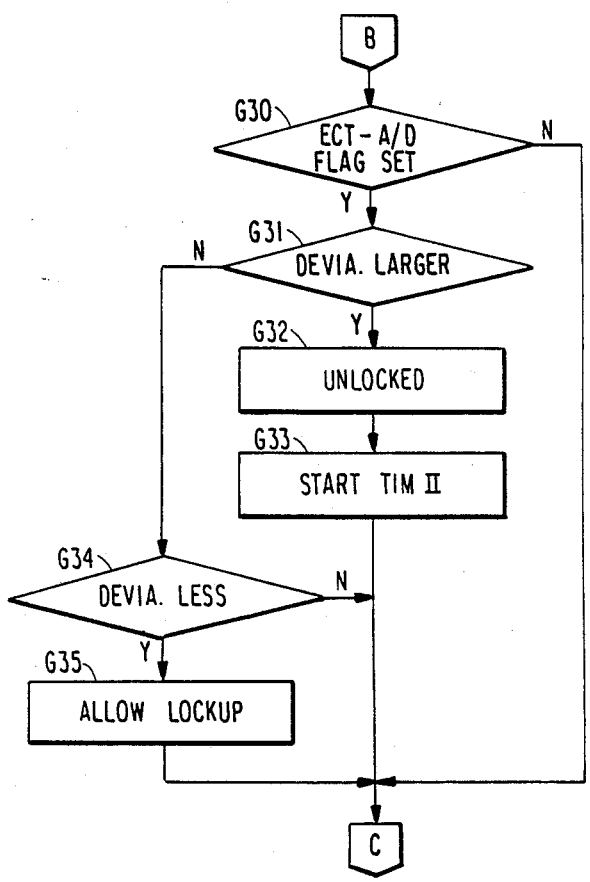

Then, the torque-converter clutch is locked or unlocked during the operation of the cruise control apparatus. Referring to FIG. 4, a check is performed to determine whether the ECT-A/D flag is set (step G30), for deciding whether the cruise control apparatus and the automatic transmission control apparatus are operated. When the cruise control apparatus is operated, a check is done to see whether the deviation of the vehicle speed is in excess of a certain threshold value (step G31). If so, the torque converter of the transmission is unlocked to obtain a larger torque (step G32). That is, when the cruise control apparatus is in operation, if the deviation of the speed exceeds a limit, then the torque converter is unlocked, irrespective of the gear shifting line used. A timer clock TimII which is so set that it produces a timeout signal after a period of 5 seconds for inhibiting the lockup is started (step G33).

If it is found that the cruise control apparatus is operated (step G30), and if the deviation of the speed is found to be less than a certain threshold value (step G31), then a check is performed to ascertain whether the deviation of the speed is small enough to hold the torque-converter clutch locked (step G34). If so, the lockup is allowed (step G35).

When the gear is actually changed, various timer clocks are set to obtain various timings for gear shifting.

Figure 5:
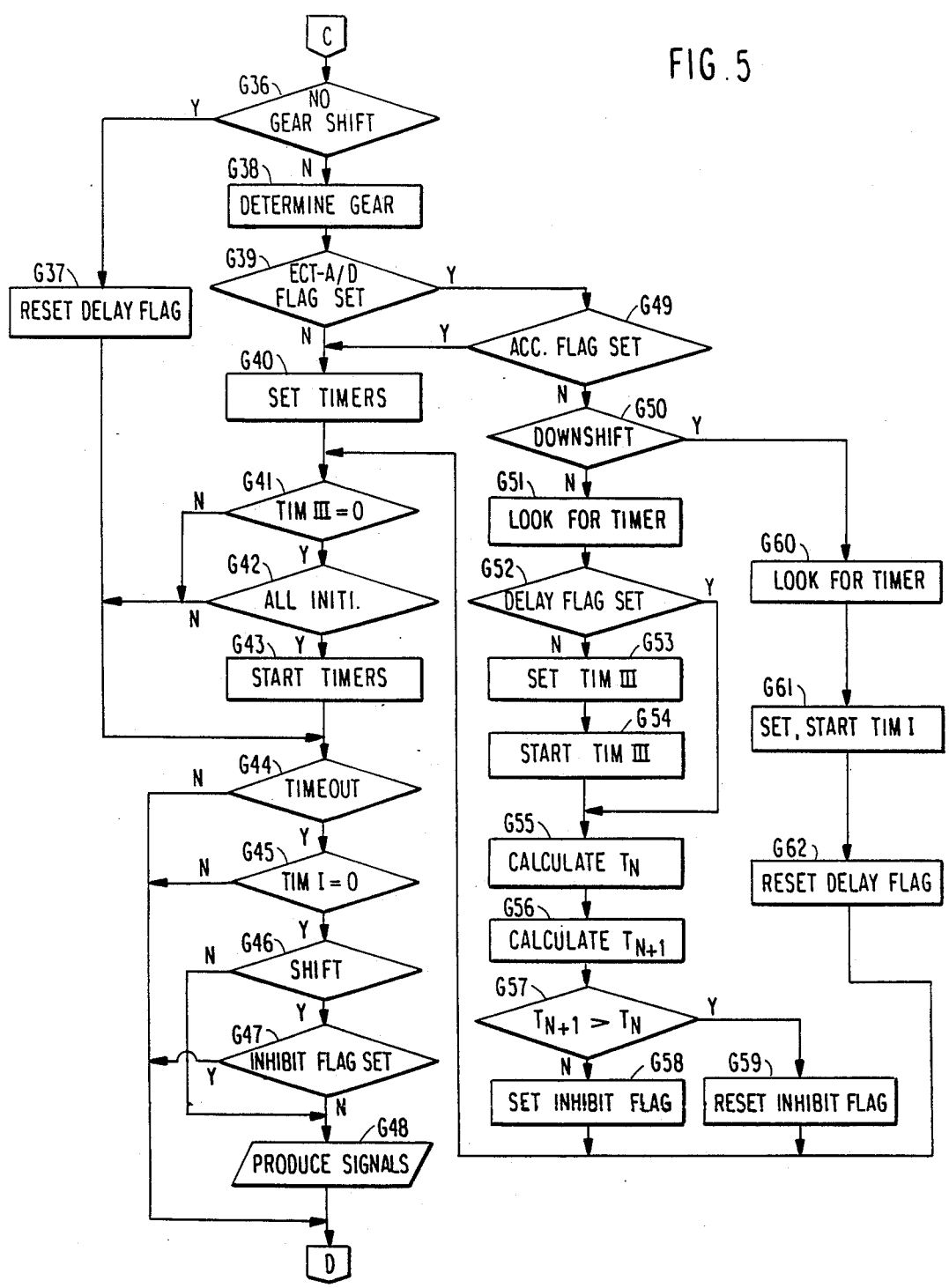

Referring to FIG. 5, after the steps G23 and G24 (FIG. 3) are carried out, if a gear shift is found to be needed (step G36), then the gear into which the transmission should shift is determined (step G38). A check is performed to ascertain whether the ECT-A/D flag is set, i.e., whether the cruise control apparatus and the automatic transmission control apparatus are in operation (step G39). If this flag is not set, the periods at which various timer clocks are set for the operation of the automatic transmission control apparatus are selected (step G40). A check is effected to determine whether an upshift delay timer clock TimIII generates a timeout signal (step G41). If so, a check is made to see if all the timer clocks $T_1$-$T_5$ for gear shifting or the timer clock $T_1$ generates the same output signal as when it is initialized (step G42). If not so, the timer clocks $T_1$-$T_5$ are started (step G43).

After the execution of the steps G23 and G24 (FIG. 3) is finished, if a gear shift is found to be unnecessary (step G36), then a check is performed to determine whether the upshift delay flag is set (step G37). If so, the flag for delaying the upshift operation by a certain period of time is reset. Then, a check is done to see whether the timer clocks $T_1$-$T_5$ generate timeout signals (step G44). If so, a check is made to ascertain whether the upshift-inhibiting timer clock TimI produces a timeout signal (step G45). If so, a check is performed to see if the transmission is upshifting (step G46). If so, a decision is made to determine whether a flag indicating inhibition of upshift is set (step G47). If not so, signals indicating the gear and the condition of the torque-converter clutch are delivered (step G48). If the flag is not set (step G46), signals indicative of the gear and the condition of the clutch are produced (step G48).

However, if the timer clocks $T_1$-$T_5$ do not yet produce timeout signals (step G44), and if the timer clock TimI for inhibiting upshift is not yet produce a timeout signal (step G45), then it is found that the transmission is upshifting (step G46). If the flag indicating inhibition of upshift is set (step G47), then signals indicating the gear and the condition of the clutch are not produced.

If it is found that the ECT-A/D flag is set (step G39), and if it is found that the flag indicating the operation of the accelerator pedal is set (step G49), then kickdown for rapidly opening the throttle valves is assumed. Therefore, only the automatic transmission control apparatus is operated. Then, control proceeds from step G40 to step G48.

If the ECT-A/D flag is set (step G39), and if the flag indicating the operation of the accelerator pedal is reset (step G49), then a check is performed to ascertain whether the transmission is upshifting or downshifting (step G50). If it is downshifting, then a downshift timer clock for a cruise control operation is looked for (step G60). The timer clock TimI for inhibiting upshift is reset and started (step G61). The flag for delaying upshift is reset (step G62). Then, control proceeds from step G41 to step G48.

If it is found that the transmission is upshifting (step G50), then the timer clock for upshift for a cruise control operation is looked for (step G51). A check is made to see whether the flag for delaying upshift by a certain period of time is set step G52). If the flag is not set, the timer clock TimIII for delaying upshift is set at 5 seconds (step G53). The timer clock TimIII is started (step G54).

The present driving force $T_N$ is calculated (step G55). The maximum driving force $T_{N+1}$ obtained after an upshift is made is calculated (step G56). The present driving force $T_N$ is compared with the maximum driving force $T_{N+1}$ (step G57). If the relation $T_N < T_{N+1}$ does not hold, then the flag for inhibiting upshift is set (step G58). If the relation $T_N < T_{N+1}$ holds, then the flag for inhibiting upshift is reset to cancel the inhibition (step G59). After step G58 or G59 is executed, the routine of steps G41 to G48 is carried out. The aforementioned driving force = torque of engine × transmission gear ratio × reduction gear ratio × power transmission efficiency × conversion ratio of torque converter × factor for accommodating loss.

Then, the throttle opening is controlled to reduce the shock produced when a gear shift is made while the cruise control apparatus is in operation. At the end of this process, the mode to which the automatic transmission control means has been switched is checked.

Figure 6:
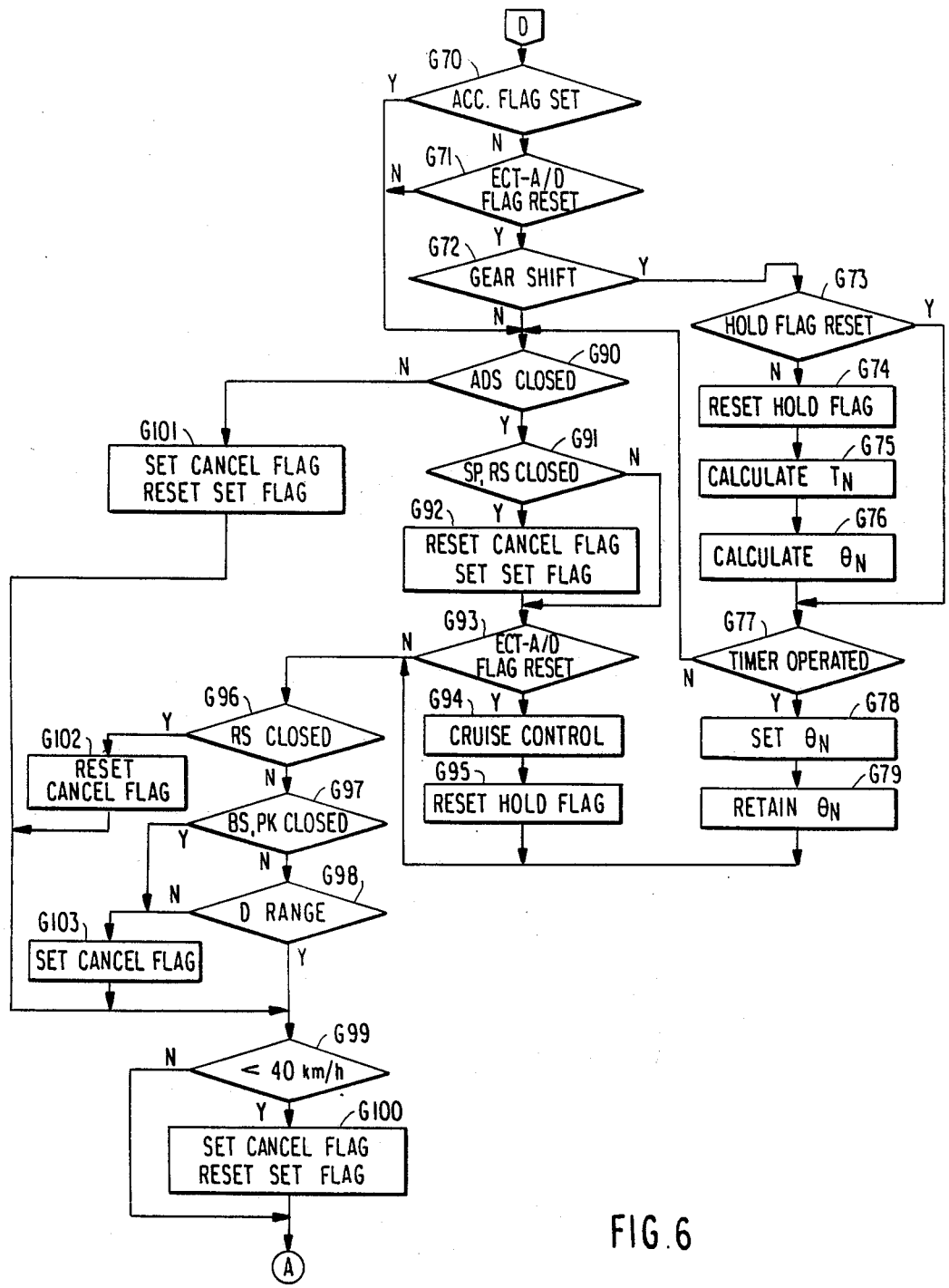

Referring to FIG. 6, a check is performed to see whether the flag indicating the operation of the accelerator pedal is set (step G70). If not so, a check is done to ascertain whether the ECT-A/D flag is set (step G71). If so, a decision is made to determine whether a gear shift is being made (step G72). Specifically, after the cruise control apparatus and the automatic transmission control apparatus are set into operation, if the flag indicating the operation of the accelerator pedal is set, it means that the kickdown system has been operated. If a gear shift is now being made, a check is performed to determine whether a throttle-holding flag for reducing the opening of the throttle valves during the gear shift is set (step G73). If this flag is not set, this throttle-holding flag is set (step G74). The present driving force $T_N$ is calculated (step G75). Then, a throttle opening $\theta_N$ which is obtained after the gear shift and provides a driving force closest to the present driving force is calculated (step G76). It is ascertained that a gear shift timer clock does not yet generate a timeout signal, i.e., a gear shift is being made (step G77). The throttle opening $\theta_N$ is set (step G78). The vacuum actuator of the cruise control mean is controlled in terms of duty cycle to maintain the throttle opening $\theta_N$ (step G79). If the resume switch RS is open (step G96), if the brake switch BS and the parking switch PK are open (step G97), if the selector lever is put in D (step G98), and if the present speed is not lower than the lowest possible cruise speed, i.e., 40 Km/h, (step G99), then control returns to the routine beginning with step G2.

If it is found that the transmission is not making a gear shift (step G72), then a check is performed to see whether the cruise main switch ADS is closed or not (step G90). If it is closed, a check is made to ascertain whether a cruise speed is presently set (step G91). If either the cruise set switch SP or the resume switch RS is closed, and if a cruise speed is set, then a flag for canceling cruise control operation is reset, and a cruise set flag is set (step G92). If the decision made in step G93 is that the ECT-A/D flag is set, then the cruise control apparatus is set into operation (step G94). The throttle-holding flag is reset (step G95). Then, the routine of steps G96–G100 is carried out.

Immediately after the cruise set flag is set in step G92, the ECT-A/D flag is not set (step G93). Therefore, the routine of steps G96–G100 is carried out. If the cruise main switch ADS is open (step G90), then the cruise cancel flag is set (step G101). If the cruise set flag is reset, the routine of steps G99–G100 is executed.

If the resume switch RS is closed (step G96), then the flag for canceling cruise is reset (step G102). If it is found that the brake switch BS and the parking switch PK are closed (step G97), or if it is found that the transmission is not in driving range (step G98), then the flag for canceling cruise is set (step G103). If the present speed is judged to be less than 40 Km/h, or the lowest possible cruise speed, (step G99), then the flag for canceling cruise is set (step G100). After the cruise set flag is reset, control returns to the routine beginning with step G2.

If it is found that the timer clock does not yet produce a timeout signal (step G77), the routine of steps G90–G100 is carried out.

That is, in order to operate both the cruise control apparatus and the automatic transmission control apparatus after only the automatic transmission control apparatus is operated, the cruise main switch ADS is closed (step G90). Either the cruise set switch SP or the resume switch RS is closed (step G91), which means that the cruise control apparatus is set at a cruise speed. The cruise set flag is set (step G92). This is checked in step G4 (FIG. 2). If the timer clock generates a timeout signal (step G5), the ECT-A/D flag is set (step G6). A check is performed to determine whether the ECT-A/D flag is set (step G39). If this flag is set, an upshift timer clock for cruise or a downshift timer clock for cruise is selected. If an upshift is made, then a decision is made to see whether the maximum driving force obtained after making the upshift exceeds the present driving force. If it is found that the ECT-A/D flag is set (step G93), then both the cruise control apparatus and the automatic transmission control apparatus can be set into operation.

Inversely, in order to operate only the automatic transmission control apparatus after both the cruise control apparatus and the automatic transmission control apparatus are operated, it is necessary that the resume switch RS be open (step G96)(FIG. 6). Either the brake switch BS or the parking switch PK is open (step G97). The flag for canceling cruise is set (step G98). If the present speed is judged to be less than 40 Km/h, or the lowest possible cruise speed (step G99), the flag for canceling cruise is set. This is checked in step G7. If it is found that the timer clock for gear shifting generates a timeout signal (step G8), the ECT-A/D flag can be reset (step G9). A check is performed to ascertain whether the ECT-A/D flag is set (step G39). If this flag is reset, a timer clock for controlling the automatic transmission is selected. If the decision made in step G39 is that the ECT-A/D flag is reset, it is possible to operate only the automatic transmission control apparatus after both the cruise control apparatus and the automatic transmission control apparatus are operated.

Figure 8:
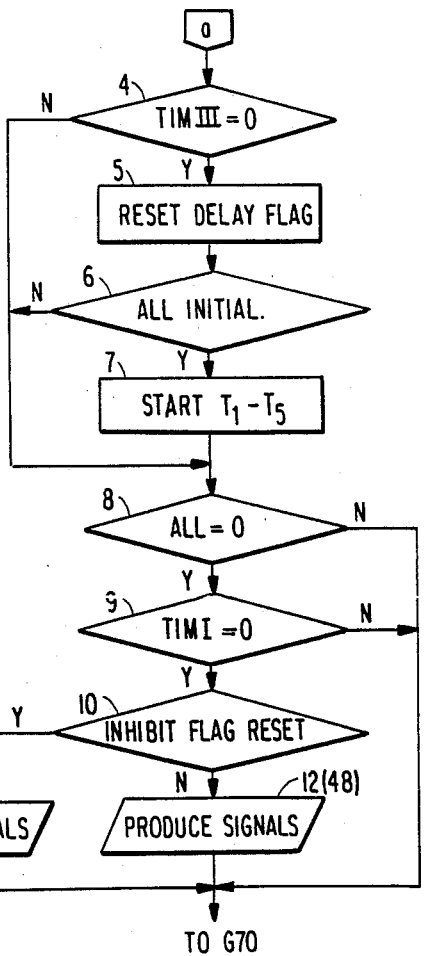
FIGS. 7 and 8 show a general flowchart for specifically illustrating some of the operations performed by the speed control apparatus shown in FIG. 1.
Figure 7:
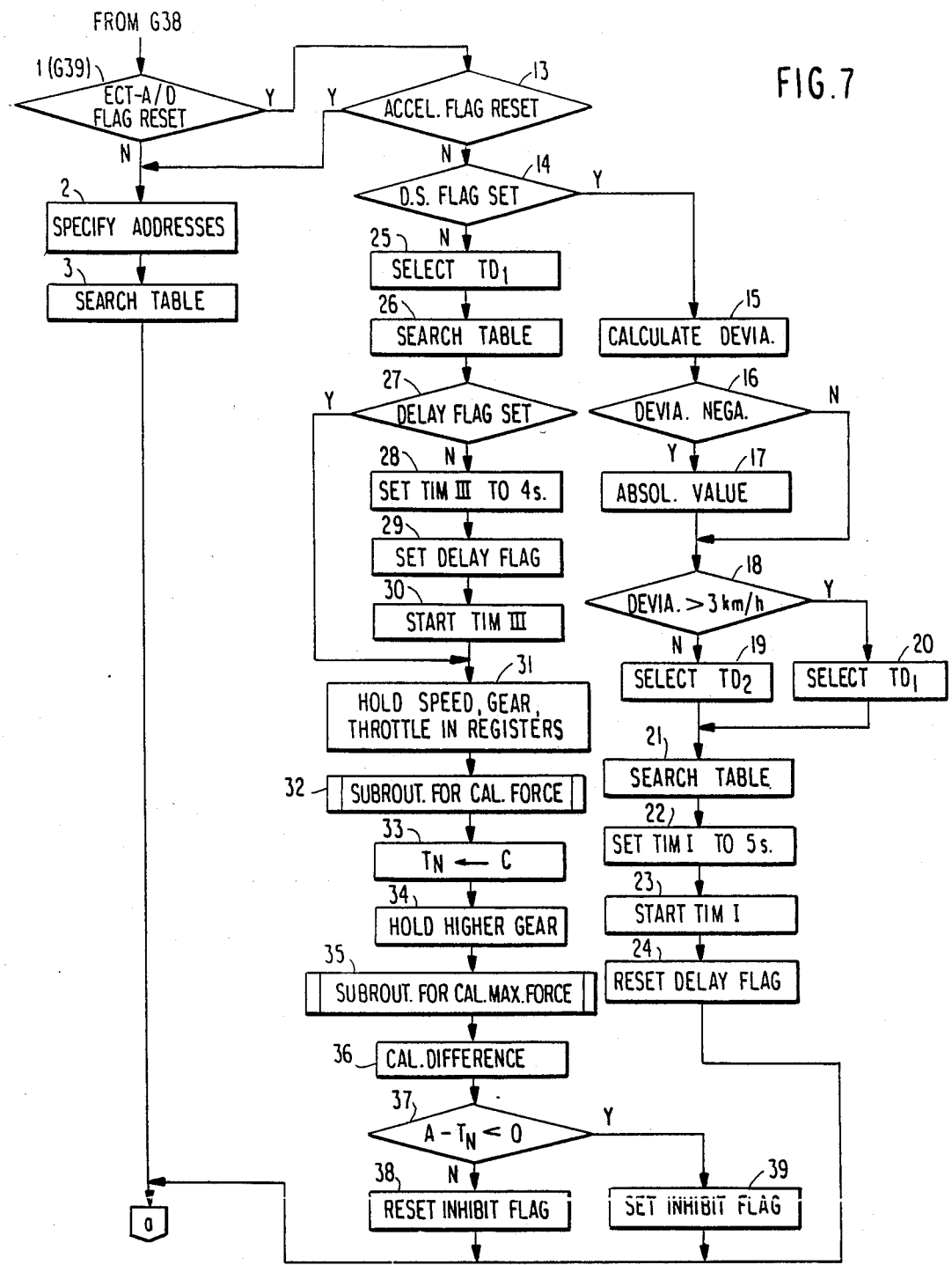

The routine of steps G39–G48 is now described in greater detail by referring to the general flowchart of FIGS. 7 and 8. A check is done to see whether the ECT-A/D flag is set, i.e., whether the cruise control apparatus is in operation (step 1 (G39)). If this flag is not set, some conditions are imposed on the flag for downshift, and the addresses of the timer clocks $T_1$–$T_5$ for the automatic transmission control apparatus in a timer table are specified (step 2). Initial values of the timer clocks $T_1$–$T_5$ are selected from the table (step 3). A check is effected to see whether the timer clock TimIII for delaying upshift generates a timeout signal (step 4). If so, the flag for delaying upshift is reset (step 5). A decision is made to determine whether all the timer clocks are initialized (step 6). Where additions are performed, they are initialized at 0. In this case, they are initialized at $T_1$–$T_5$, respectively, and substractions are performed. If it is found that all the timer clocks are initialized (step 6), then the timer clocks $T_1$–$T_5$ are started (step 7). Then, a check is performed to ascertain whether all the timer clocks $T_1$–$T_5$ are decremented down to zero and a gear shift is completed (step 8). A check is performed to ascertain whether the time clock TimI for inhibiting upshift is is cleared (step 9). Then, a check is done to determine whether an upshift-inhibiting timer flag is set (step 10). If so, a signal indicating a downshift and a signal for locking the torque converter are delivered (step 11). If the upshift-inhibiting timer flag is reset, a signal indicating an upshift and a signal for locking the torque converter are produced (step 12).

Figures 11, 12:
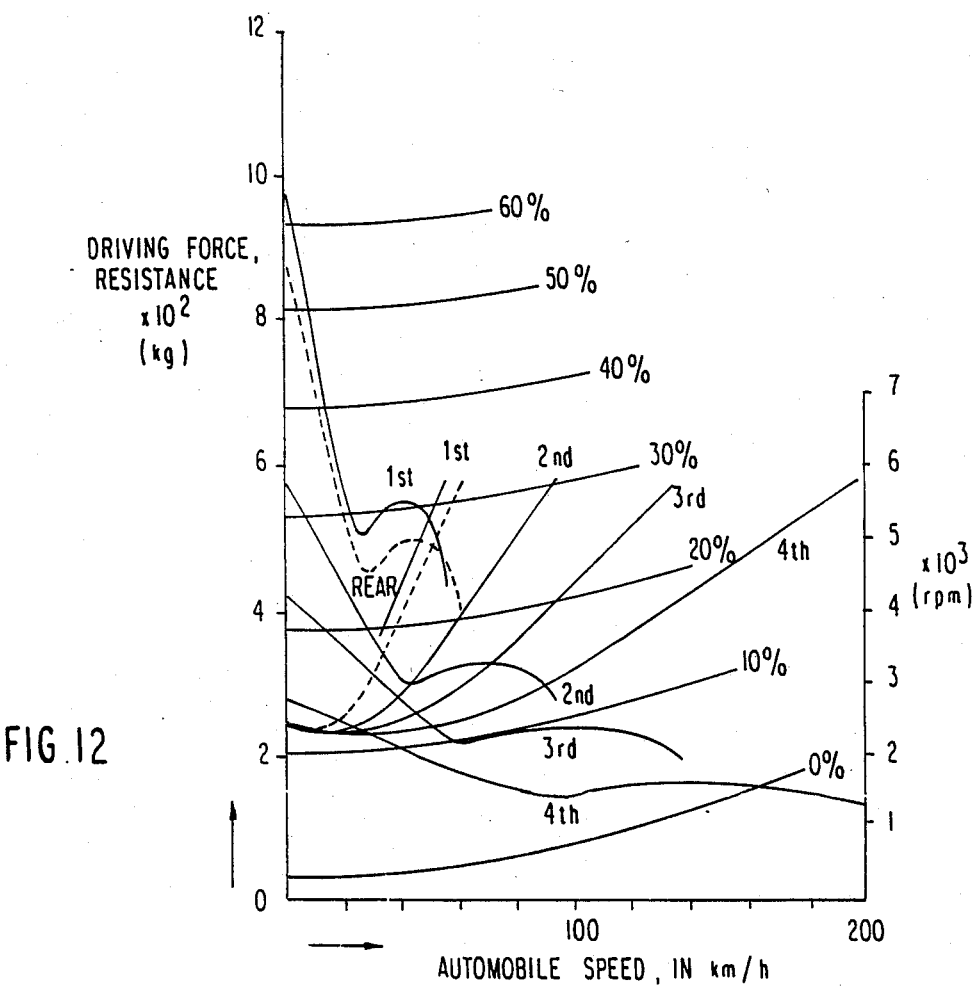
FIG. 11 shows a table of various kinds of data used when the automatic transmission of an automobile upshifts and downshifts while the automatic transmission control apparatus and the cruise control apparatus are in operation.
FIG. 12 is a graph showing the characteristics of a driving force measured in practice.
Figure 13:
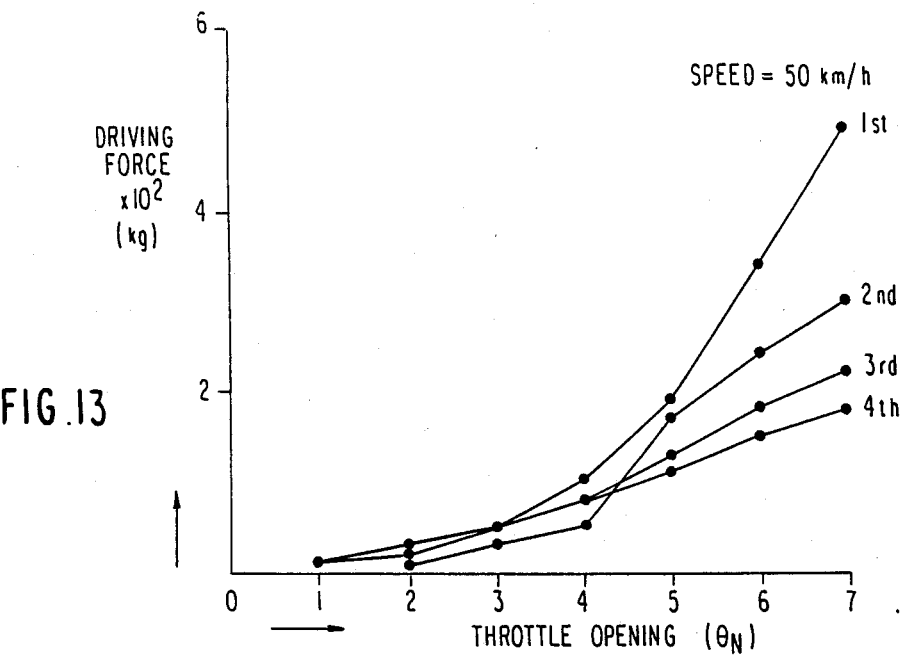
FIG. 13 is a graph showing examples of the characteristics of the driving force used in the apparatus shown in FIG. 1.

If the ECT-A/D flag is set (step 1 (G39)), and if the flag indicating the operation of the accelerator pedal is reset (step 13), then a check is made to determine whether a flag indicating a downshift is set (step 14). If this flag is set, the automatic transmission is caused to downshift while the cruise control apparatus is in operation. For this purpose, the cruise speed that is set by the driver is subtracted from the present speed to obtain the deviation of the set speed (step 15). If this deviation is a negative value (step 16), then the absolute value of the deviation is taken (step 17). A check is done to determine whether the absolute value of the deviation is greater than a certain threshold value by more than 3 Km/h (step 18). Addresses in the table $TD_1$ or $TD_2$ of data on a downshift timer clock are specified (step 19 or 20), depending on the absolute value of the deviation. The tables $TD_1$ and $TD_2$ are shown in FIG. 11, and the timer clock is used when the cruise control apparatus and the automatic transmission control apparatus are operated. Time limit values for the timer clocks $T_1$–$T_5$ are selected from the table (step 21). The upshift-inhibiting timer clock TimI is set at 5 seconds (step 22). This timer TimI is started (step 23). The flag for delaying upshift is reset (step 24). Specifically, after a request for an upshift is found, the upshift is delayed. Before this upshift is started, if the conditions on a downshift are met, the downshift is made. For this purpose, the timer clock TimIII for delaying upshift is cleared.

A check is performed to ascertain whether the flag indicating a downshift is set (step 14). If this flag is reset, an upshift is made while the cruise control apparatus and the automatic transmission control apparatus are in operation. First, addresses of data on the time limit of the upshift timer clock in the table $TD_1$ shown in FIG. 11 are specified (step 25), the timer clock being used when the cruise control apparatus and the automatic transmission control apparatus are in operation. Time limit values for the timer clocks $T_1$–$T_5$ are selected out of the table $TD_1$ (step 26). If the flag for delaying an upshift by a certain period of time is reset (step 27), then the timer clock TimII for delaying the upshift is set at 4 seconds (step 28). The flag for delaying the upshift is set (step 29). The timer clock TimIII is started (step 30). Once the timer clock TimIII has been set, it will not be reset because the flag for delaying upshift is set. A register X is used as an index register, and the present speed is held in this register. The present gear is held in a register A. The present throttle opening is held in a register B (step 31). The subroutine for calculating the driving force presently obtained is executed (step 32), the subroutine being illustrated in FIG. 9. The calculated driving force is held in a register C as the present driving force $T_N$ (step 33). The next higher gear of the transmission is held in the register A (step 34). The subroutine for calculating the maximum driving force obtained when one upshift is made is executed, the subroutine being illustrated in FIG. 10 (step 35). The present driving force is subtracted from the driving force obtained when one upshift is made (step 36). A check is performed to ascertain whether this difference is negative (step 37). If so, the flag for inhibiting upshift is set (step 39). If the difference is positive, the flag for inhibiting upshift is reset (step 38). Then, the routine including steps 4–12 (G48) and subsequent steps is carried out.

In this way, when an upshift is made while the cruise control apparatus and the automatic transmission control apparatus are in operation, the driving force obtained after the upshift is made is calculated. It is decided whether an upshift is really made. When such an upshift is made, if the necessary driving force will not be obtained, then the upshift is not carried out.

This driving force is expressed in terms of vehicle speed, engine speed, and throttle opening in FIGS. 11 and 12. FIG. 11 shows the result of a measurement. FIG. 12 shows the characteristics of the driving force.

Figure 14:
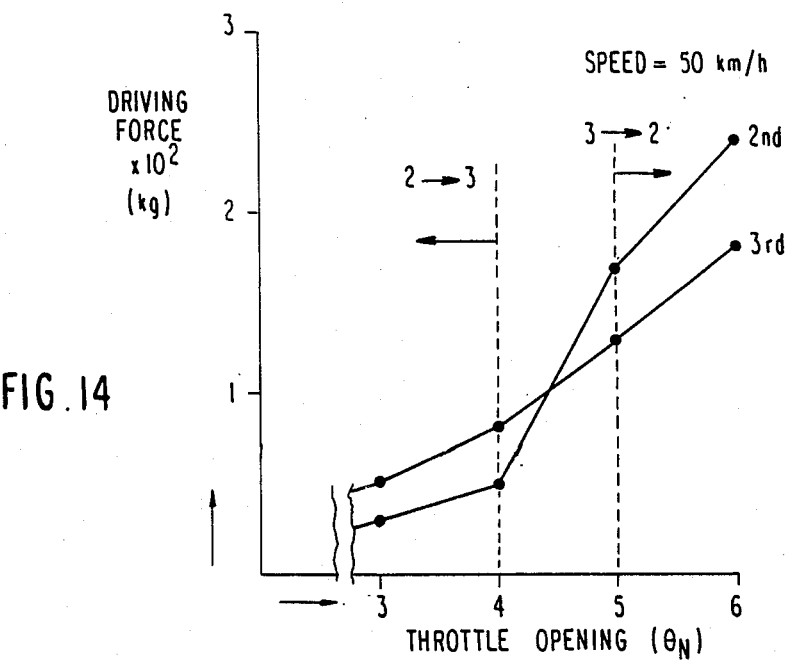
FIG. 14 is a graph in which the driving force used, in the apparatus shown in FIG. 1 is plotted against the throttle opening.

The process of steps 31–39 is next described by referring to FIG. 14 which shows the characteristics of the driving force. It is assumed that the present speed control apparatus is not operated and that the automobile is traveling at 50 Km/h. If the transmission is in third at this time, it downshifts when the throttle opening $\theta_N$ reaches TH5. When the transmission is in second, it upshifts when the throttle opening $\theta_N$ reaches TH4.

Where the present speed control apparatus is operated, the maximum driving force obtained when the transmission is in third is 45 Kg. The present driving force is 50 Kg, because the transmission is in second and the throttle opening $\theta_N$ is equal to TH4. In this case, therefore, the transmission does not upshift from second.

Suppose the opening is equal to TH3. When the transmission is in second, the driving force is 30 Kg. At this time, the transmission can upshift.

The subroutine for calculating driving force (step 32) is described below by referring to FIG. 9. The tables (a)–(f) shown in FIG. 15 contain data on driving force and are stored in the memory. In each table, the transmission can shift into 1 (first), 2 (second), 3 (third), and 4 (fourth). In the tables a, b, c, d, e, and f, the vehicle speed is set to 40 Km/h, 50 Km/h, 60 Km/h, 70 Km/h, 80 Km/h, 90 Km/h, respectively. In each table, the throttle opening $\theta_N$ can take any one of eight values, i.e., TH0, TH1, TH2, TH3, TH4, TH5, TH6, and TH7. The value of driving force is given for every throttle opening.

Figure 9:
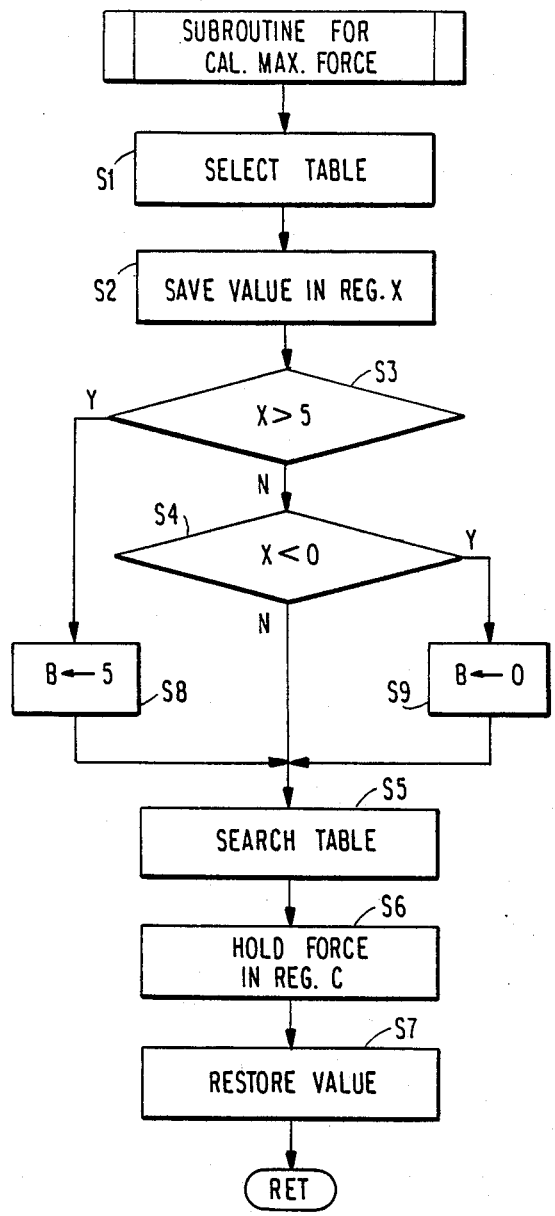
FIG. 9 shows a flowchart for illustrating a subroutine performed to calculate driving force.

Referring to FIG. 9, the value of the present vehicle speed is divided by 10 so that it may coincide in unit with the tables. Four is subtracted from the quotient to obtain an index, which is held in the register X. Where the vehicle speed is 40 Km/h as in table (a), for example, 40 is divided by 10. The quotient is 4 from which 4 is subtracted. The result is 0, which is the index. The value held in the register X is saved (step S2). If the data held in the register X is the highest value which is larger than 5 and is not contained in any table stored in the memory (step S3), value "5" is held in the register B (step S8). If the data held in the register X is the lowest value that is less than 0 and is contained in none of the tables stored in the memory (step S4), then value "0" is held in the register B (step S9). If the value held in the register X is less than 5 (step S3), and if it is larger than 0 (step S4), then the value of the present driving force is looked for, based on the index of the table held in the register X, the present gear held in the register A, and the present throttle opening held in the register B (step S5). The value of the driving force obtained in this way is held in the register C (step S6). The value held in the register X which was saved in step S2 is restored. Thus, the "subroutine for calculating driving force" is completed.

The "subroutine for calculating maximum driving force" which is given in step 35 is described below by referring to FIG. 10. One example of the table of data on the maximum driving force which is stored in the memory is shown in FIG. 16, where 6 vehicle speeds, i.e., 40 Km/h, 50 Km/h, 60 Km/h, 70 Km/h, 80 Km/h, and 90 Km/h, are given. The transmission can shift into 2 (second), 3 (third), and 4 (fourth). The value of the maximum driving force is stored for every gear of the transmission.

Figure 10:
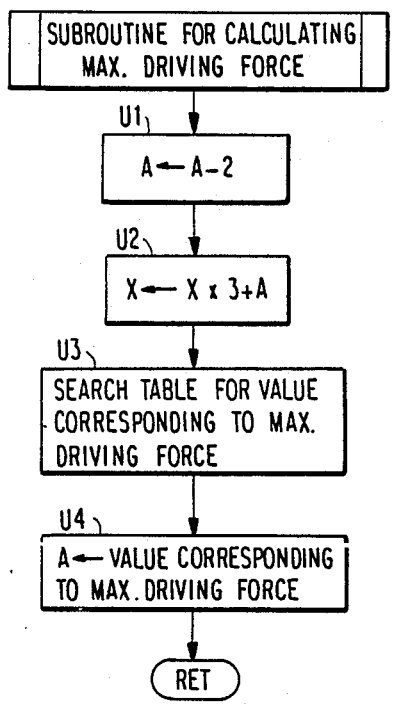
FIG. 10 shows a flowchart for illustrating a subroutine performed to calculate maximum driving force.

Referring to FIG. 10, in order to accommodate the numerical values used in the table of FIG. 16, 2 is subtracted from the number given to the gear of the transmission and held in the register A (step U1). The value held in the register A is multiplied by 3, and the value held in the register A is added to the product. The obtained value is held in the register X (step U2). In the table of data on the maximum driving force, the vehicle speed is divided into 40 Km/h, 50 Km/h, 60 Km/h, 70 Km/h, 80 Km/h, and 90 Km/h. For each vehicle speed, the maximum driving force is given for three transmission gears, i.e., 2 (second), 3 (third), and 4 (fourth). A calculation is performed to specify an address in the table. The subroutine searches the table for the corresponding value of the maximum driving force (step U3). The located maximum force is held in the register A (step U3). Thus, this subroutine is finished.

As described above, the novel speed control apparatus comprises an automatic transmission control means for locking or unlocking the torque converter of the automatic transmission and a cruise control means for controlling the throttle opening to maintain the vehicle speed at the speed set by the driver. The torque converter has a clutch directly coupled to the converter. The clutch is engaged or disengaged by the automatic transmission control means according to one gear shift line selected from several gear shift lines stored in a memory. This selection is made according to the engine speed and the throttle opening. The speed control apparatus estimates the driving force of the transmission obtained when the transmission makes an upshift from the present gear, from the present engine speed, the throttle opening, and the transmission gear. If a sufficient driving force is not obtained, such an upshift is inhibited. When the automatic transmission control means and the cruise control means are operated, if the cruise speed is set to such a value that an upshift will not provide a sufficient driving force, then the upshift is not made by the automatic transmission. Hence, hunting can be prevented. Consequently, the passenger feels good.

Specifically, when the transmission upshifts during the operation of the automatic transmission control means and the cruise control means, the routine of steps 27-35 is carried out. That is, the present vehicle speed the present transmission gear, and the throttle opening are held in their respective registers, and the driving force presently obtained is calculated. Then, the next higher gear is held in the register, and the maximum driving force which is obtained after an upshift is made is calculated. The present driving force is subtracted from the driving force that will be obtained after an upshift is made. If the difference is negative, then a flag for inhibiting upshift is set. If the difference is positive, this flag is reset. In this way, if the requisite driving force is not obtained, the speed control apparatus prevents the transmission from upshifting.

In the above example, several gear shift lines are stored in a memory. The torque converter is locked or unlocked according to the gear shift line, which is selected from the stored lines according to the engine speed and the throttle opening. Some of the gear shift lines are used when only the automatic transmission control means is operated. The other gear shift lines are used when both the automatic transmission control means and the cruise control means are operated. The latter gear shift lines can be made to have wider hysteresis than the former. Any gear shift can be prevented when the load increases only slightly. Hence, the occurrence of hunting can be prevented.

Referring to FIG. 17, when only the automatic transmission control means is in operation, if the throttle opening $\theta_N$ is TH7, the transmission upshifts from first to second at an engine speed of 1000 rpm but it downshifts from second to first at an engine speed of 850 rpm. Thus, hysteresis having a width of 150 rpm is formed. Referring next to FIG. 19, when the automatic transmission control means and the cruise control means are in operation, if the throttle opening $\theta_N$ is equal to TH7, the transmission upshifts from first to second at 1200 rpm but it downshifts from second to first at 850 rpm. As a result, hysteresis having a width of 350 rpm takes place. For this reason, a gear shift is less likely to occur during the operation of both the automatic transmission control means and the cruise control means than during the operation of only the automatic transmission control means.

Also in the above example, the automatic transmission control means locks or unlocks the torque converter to which the clutch is directly connected, according to one gear shift line selected from gear shift lines stored in the memory. This selection of the gear shift line is made according to the engine speed and the throttle opening. The automatic transmission control means corresponds in structure to an independent automatic transmission control apparatus including a known automatic transmission and a control circuit for controlling the operation of the transmission. The cruise control means which controls the throttle opening to maintain the vehicle speed at the speed set by the driver corresponds in structure to a known cruise control apparatus which can perform a cruise control operation by itself by adjusting the throttle opening. Also in the above example, the cruise control operation is performed mainly by the automatic transmission control means. It is also possible that the operation of the automatic transmission is controlled mainly by the cruise control means.

As described above, a speed control apparatus according to the invention comprises: an automatic transmission control means for controlling the operation of the automatic transmission of an automobile in such a way that the transmission shifts into another gear, depending on the vehicle speed or the engine speed and also on the engine load or the throttle opening; and a cruise control means which controls the throttle opening to maintain the vehicle speed at the speed set by the driver. The speed control apparatus estimates the driving force of the transmission obtained when the transmission makes an upshift from the present engine speed, the throttle opening, and the gear of the transmission, and inhibits such an upshift if a sufficient driving force is not obtained. If the cruise speed is set to such a speed that a sufficient driving force is not obtained after an upshift is made, then the automatic transmission is not allowed to upshift. Therefore, the occurrence of hunting can be prevented. Consequently, the passenger feels good.

What is claimed is:

1. A speed control apparatus for an automobile having an automatic transmission and a throttle, the apparatus comprising:

automatic transmission control means for controlling the operation of the automatic transmission such that the automatic transmission shifts gears depending on the vehicle speed or the engine speed and also on the engine load or the throttle opening;

cruise control means for controlling the throttle opening to maintain the vehicle speed at a speed set by the driver; and determining and inhibiting means for determining the present driving force of the automatic transmission in accordance with the present engine speed, throttle opening and transmission gear, for determining a subsequent driving force of the automatic transmission when said automatic transmission control means controls the automatic transmission to upshift to a different transmission gear, and for inhibiting the upshift of the automatic transmission by said automatic transmission control means only if the determined subsequent driving force is less than the determined present driving force.

2. The speed control apparatus of claim 1, further comprising a memory for storing a plurality of gear shift lines; and means for selecting one of the stored gear shift lines in accordance with the engine speed, the throttle opening, and the transmission gear, to thereby lock or unlock the torque converter of the automatic transmission;

and wherein some of the plurality of stored gear shift lines are only selected when the automatic transmission control means is operated, while the remaining stored shift lines are selected when both the automatic transmission control means and the cruise control means are operated.

3. The speed control apparatus of claim 2, wherein those stored gear shift lines which are selected when both the automatic transmission control means and the cruise control means are operated have wider hysteresis relative to those stored gear shift lines that are only selected when the automatic transmission control means is operated. 219

* * * * *